Aug. 12, 1958  R. P. MALOOF  2,846,816
AIR HANDLING AND HEATING APPARATUS
Filed Oct. 1, 1954  2 Sheets-Sheet 1
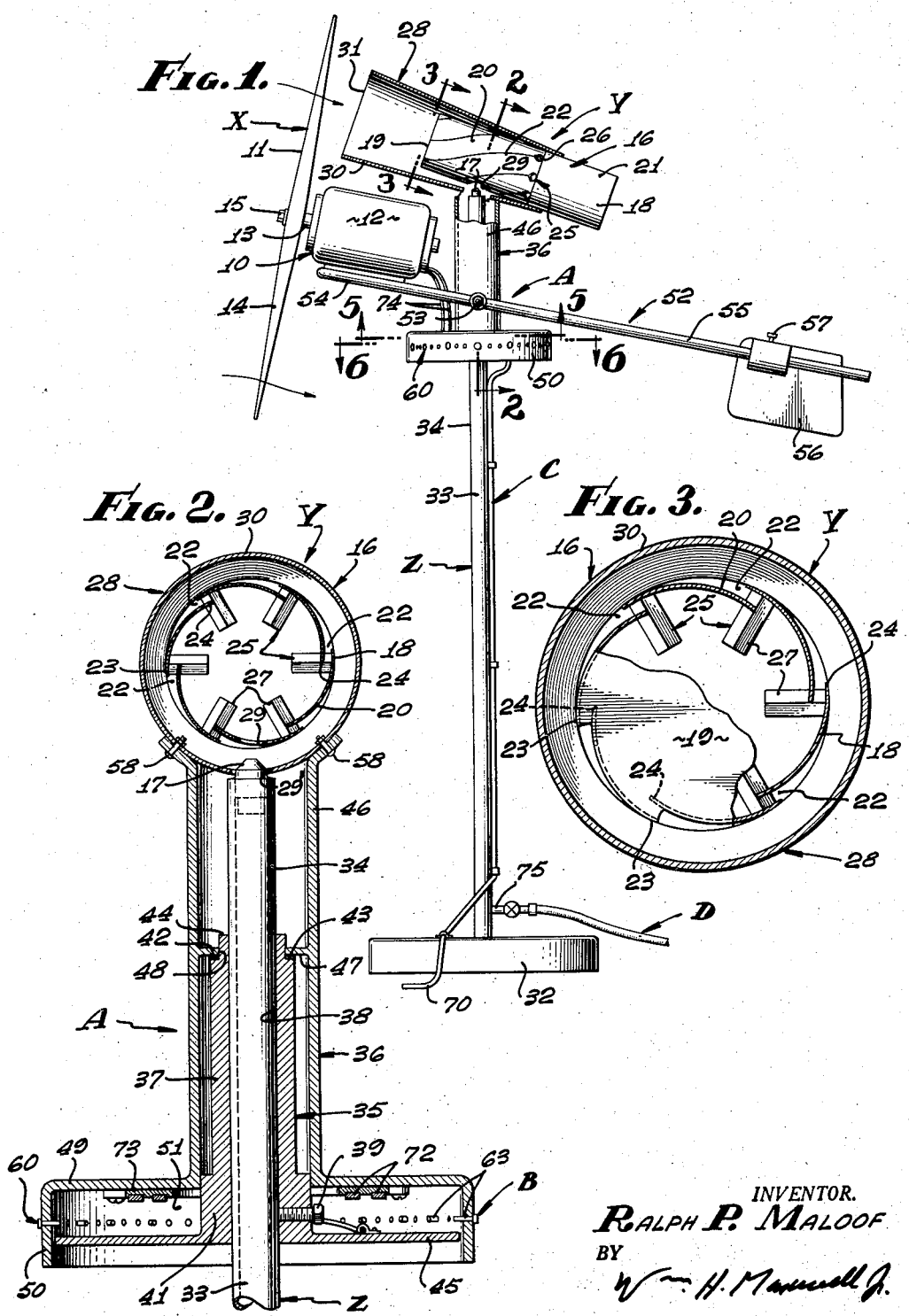
INVENTOR.
RALPH P. MALOOF
BY
Wm. H. Maxwell Jr.
AGENT.

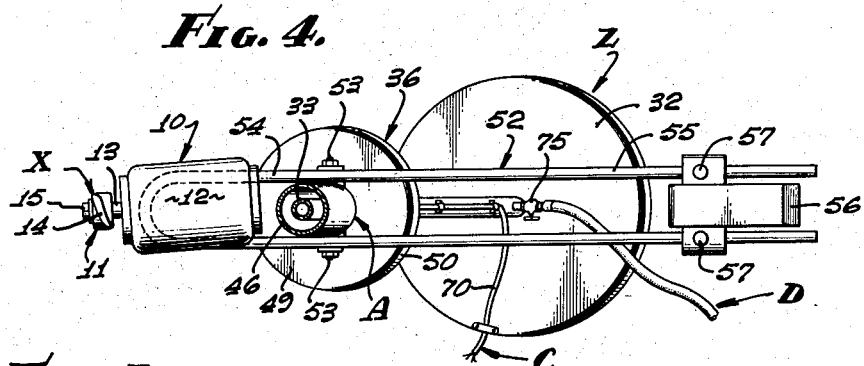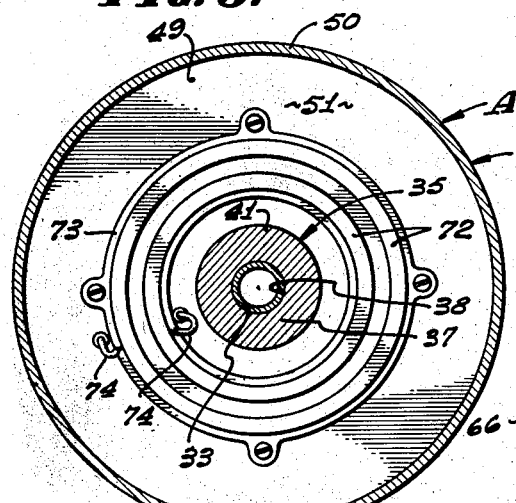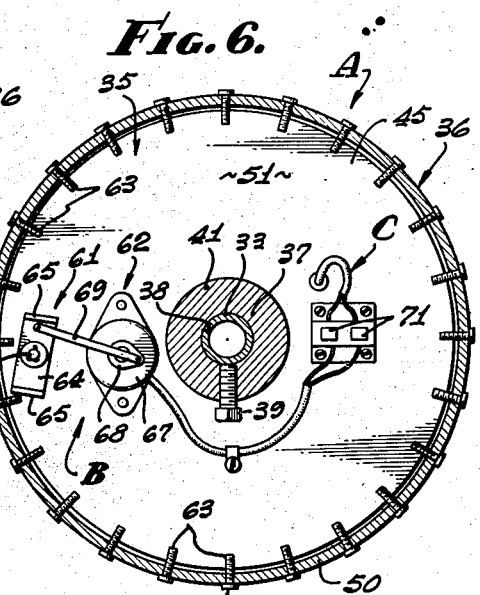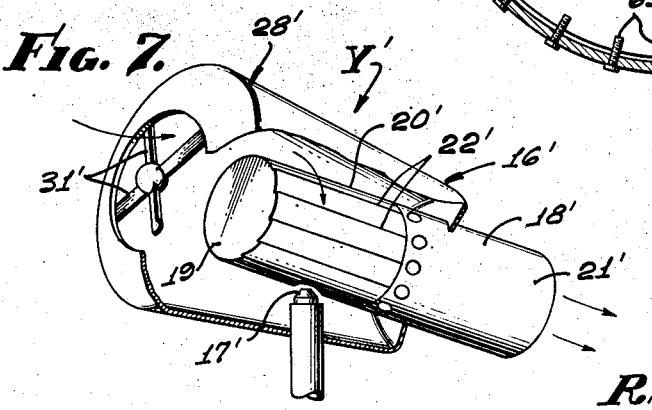

2,846,816

AIR HANDLING AND HEATING APPARATUS

Ralph P. Maloof, San Bernardino, Calif.

Application October 1, 1954, Serial No. 459,809

8 Claims. (Cl. 47—2)

This invention relates to an air handling and heating apparatus and is particularly concerned with an air circulating and heating unit adapted to agricultural use, that is, for heating orchards and the like.

Because of evaporation and/or radiation, plants may cool off faster than the air in which they are immersed causing pockets of extremely cool air to form around or near the plant. When pockets of air are formed the water content thereof will "freeze out" or precipitate from the body of air causing frost. Also, cold drifts of air often move in from areas adjacent a garden site and engulf the garden site in a large body of cold air. Furthermore, dense bushes and shrubs are similar to insulated rooms, that is, they are hollow inside having nearly solid walls formed of leaves, with the result that pockets of air are ordinarily retained within them.

It is an object of this invention to provide an air handling and heating apparatus that will circulate air and thereby prevent the formation of pockets of cold air. It is also an object of this invention to provide means for agitation which causes the pockets of cold air to break up as soon as they form.

It is another object of this invention to provide an apparatus of the character referred to which supplies warm air of relatively high viscosity by virtue of its higher temperature, which air has a tendency to stick to open plants and trees.

It is still another object of this invention to provide an apparatus of the character referred to that forces the movement of air so that the bushes, plants and trees are agitated and so that air is circulated to the interior thereof with the result that they are uniformly heated inside and out.

It is still another object of this invention to provide an air handling and heating apparatus which is adapted to handle air in a manner to deliver it to a wide variety of plants including small or low-lying plants as well as trees and the like.

An object of this invention is to provide an apparatus which is positive and economical in action and which is operable to reach into the corners of the grounds being heated, and which is simple in construction and quiet and reliable in operation.

It is a further object of this invention to extend the effective distance or travel of an air stream driven by a fan that moves. Through the structure of the present invention the fan is moved intermittently as it is revolved about an axis so that it is stopped in a fixed position for a predetermined length of time which results in increased momentum being imparted to the air stream and surrounding air thereby increasing the penetration of the stream in that direction.

The various objects and features of my invention will be fully understood from the following detailed description of typical preferred forms and applications of my invention, throughout which description reference is made to the accompanying drawings, in which:

Fig. 1 is a side elevation of the apparatus that I have provided. Fig. 2 is an enlarged sectional view taken substantially as indicated by line 2—2 on Fig. 1. Fig. 3 is an enlarged sectional view taken as indicated by line 3—3 on Fig. 1. Fig. 4 is a plan view of the apparatus as shown in Fig. 1. Figs. 5 and 6 are enlarged detailed sectional views taken as indicated by lines 5—5 and 6—6 on Fig. 1, and, Fig. 7 is a perspective view showing a modified form of construction which may be employed in the structure shown in Fig. 1.

The air handling and heating apparatus that I have provided is particularly adapted to warm and circulate air over a wide area and to effect a general temperature rise over that area by heating, circulating and agitating the air. The air handling and heating apparatus involves, generally, an air circulating means X and an air conditioning means Y. The means X and Y are rotatably carried on a standard Z so that a stream of conditioned air can be circulated completely around the apparatus.

In addition to the air circulating means X, air conditioning means Y and standard Z, the present invention involves a rotatable head A, a control means B, a power supply C and a fuel supply D. The head A is rotatably carried at the upper end portion of the standard Z and supports the air circulating means and air conditioning means X and Y. The control means is preferably carried by the standard Z and operates to control the speed of operation or rotation of the head A about the standard Z. The power supply and fuel supplies C and D are carried by the standard Z, and in the case of the power supply a sliding contact means is provided between the standard Z and the head A. It will be apparent from the following description how these parts are inter-related to form the apparatus of the present invention.

The air circulating means X is provided to move large quantities of air at relatively high velocity and involves a prime mover 10 that drives a propeller or fan 11. In the case illustrated the prime mover 10 is an electric motor having a housing 12 and a shaft 13 projecting forwardly from the housing. It is to be understood that any kind of prime mover may be employed as, for example, an internal combustion engine. The fan 11 is carried on the shaft 13 and has pitched blades 14 that move air axially of the prime mover 10 and fan 11 when the fan is rotated by the shaft 13. The fan 11 is retained on the shaft 13 by a nut 15.

The air conditioning means Y is provided to temper a portion of the air handled by the circulating means X by heating the air as it moves from the apparatus. Means Y involves a burner 16, a fuel nozzle 17 that injects fuel into the burner 16, and a shroud 28 that surrounds the forward end portion of the burner. The burner 16 is located in the stream of air that is delivered from the means X and is on an axis spaced from and substantially parallel with the axis of the prime mover 10 and fan 11. In the preferred form of the invention the burner 16 involves, generally, a central elongate tubular shell 18 closed by a wall 19 at the forward end thereof and having a forward combustion section 20 and a rearwardly opening delivery section 21. The shell 18 is preferably round in cross section and the section 20 has longitudinally disposed slots 22 for feeding combustion air to the interior of the burner. It is a feature of this invention that the slots 22 present tangentially faced openings, that is, openings that are faced to receive air as it moves around the shell 18, for example, around the shell in a clockwise direction. In practice, there is a plurality of slots 22 and each slot has an outer leading lip 23 that overlies an inner trailing lip 24 with the result that air entering the section 20 moves spirally inward from the exterior to the interior thereof. As clearly shown in Fig. 1 of the drawing, the slots 22 are pitched or extend along the section 20 in a helix to receive air as it moves rearwardly along the shell 18.

In Fig. 7 of the drawings, I have illustrated a modified air conditioning means Y' provided by the present invention involving a burner 16', a fuel nozzle 17' and a shroud 28'. The burner 16' is located in the air stream as above described in connection with the first form of the invention and involves a central elongate tubular shell 18' closed by a wall 19' at the forward end thereof. In this form of the invention the burner 16' includes a forward combustion section 20' and a rearwardly opening delivering section 21', all as above described in connection with the means Y. However, in this form of the invention the shell 18' throughout the length of the combustion section 20' is provided with straight longitudinally disposed slots 22'. In this form of the invention the air is delivered to the combustion section 20' tangentially of the shell 18' as hereinafter described.

The section 21 is a simple imperforate section of the tubing 18, being a continuation of the forward section 20, which section 21 opens rearwardly to deliver burnt gases and heated air to be mingled with the remaining air handled by the apparatus. Turbulence of the air as the fan 11 operates will cause the portion of the air tempered by the means Y to be thoroughly mixed with the remaining air handled by the apparatus. As shown in Figs. 1 and 3 of the drawings, I have provided turbulence generators 25 at the burner 16. As shown, the turbulence generators 25 are provided between the sections 20 and 21 of the shell 18, and each involves an inlet opening 26 in the shell 18 and a spoiler 27 that is carried by the shell 18 and projects inwardly toward the center axis of the burner. The spoiler 27 projects inwardly from the forward side of the opening 26 and terminates at a point spaced from the center axis, with the result that air is drawn in through the opening 26 to co-mingle with gases within the burner 16.

The fuel nozzle 17 may vary widely depending upon the type of fuel used, which fuel may be gas or liquid fuel. The nozzle 17 is preferably a spray nozzle that injects fuel into the section 20 of the burner 16 through an opening 29 in the shell 18. The opening 29 is located at the lower side of the shell 18 about midway between the ends of the section 20, while the nozzle 17 is mounted adjacent the opening 29 and is carried by the standard Z, as will be hereinafter described.

The shroud 28 is provided to collect and deliver air to the forward section 20 of the burner 16 and involves an inlet duct 30 that is coaxial with and surrounds the combustion section 20 of the burner. The duct 30 is a flared tubular element that joins with the burner 16 at the forward end portion of the section 21 and extends forwardly and outwardly from the section 21 and terminates forward of the wall 19 of the burner. The forward end 31 of the duct 30 is of enlarged diameter and is adapted to receive a portion of the flow of air delivered from the fan 11. The duct 30 feeds air to the slots 22 and it will be apparent from the drawings how the air progresses rearwardly through the duct 30 to enter the slots tangentially to be delivered to the interior of the combustion section 20.

In the form of the invention shown in Fig. 7 of the drawings, the air conditioning means Y' includes vanes 31' at the forward end of the shroud 28'. The vanes 31' are pitched and act to deflect the air entering the duct 30' so that it is directed spirally through the duct and so that it enters the slots 20' tangentially of the shell 18'.

The standard Z is provided to rotatably support the air circulating and conditioning means X and Y and involves a base 32 and a column 33. The base 32 may be a flat horizontally disposed disc shaped element of substantial diameter and weight. The column 33 is vertically disposed and projects upwardly from the base 32 and terminates in a flat horizontal end face. The column 33 is tubular, has a round external wall 34 and carries parts of the means X and Y as hereinafter described. The rotatable head A is carried on the upper end portion of the column 33 and involves a spindle 35 and a hub 36. The spindle 35 has an elongate vertically disposed body 37 with a central bore 38 and is rotatably engaged with the wall 34 of the column 33. A set screw 39 is carried by the body 37 and engages the wall 34 to position the spindle vertically of the column as desired. A boss 41 of enlarged diameter projects from the lower end portion of the body 37 and an upwardly facing bearing shoulder 42 is provided at the upper end portion of the body 37. A thrust washer 43 is carried by the shoulder 42. The body 37 has a centering boss 44 that projects upwardly from the shoulder 42, and has a flange 45 projecting radially from its lower end.

The hub 36 has an elongate vertically disposed tubular body 46 substantially coextensive with the body 37 and is provided with an inwardly projecting bearing plate 47 adapted to have supporting engagement with the thrust washer 43. There is a central opening 48 through the plate 47, which opening rotatively receives the boss 44 while the lower end portion of the body 46 is rotatively engaged over the bearing boss 41. A flange 49 projects radially from the lower end portion of the body 46, which flange is spaced upwardly from the flange 45. A rim 50 depends from the flange 49 terminating at the periphery of the flange 45 thereby defining an annular chamber 51 that surrounds the body 37 of the head A. It will be apparent from the foregoing that the hub 36 of the head A is free to rotate about the spindle 35 thereof.

The air circulating means X and the air conditioning means Y above described, are carried by the head A. The circulating means X is carried at the forward side of the head A on a substantially horizontal axis, preferably on a slightly inclined axis so that the fan 11 faces upwardly and draws air toward the apparatus and directs it rearwardly away from the apparatus. As illustrated, a frame 52 is pivotally carried on trunnions 53 that project from the sides of the body 46, which frame 52 has a forwardly projecting arm 54 that carries the means X and a rearwardly projecting arm 55 that carries a shiftable counterbalance 56. The position of the frame 52 and of the balance 56 may be set by means of suitable lock nuts or screws 57.

The air conditioning means Y is carried at the upper end of the head A on a substantially horizontal axis preferably on an axis inclined to the axis of the air circulating means X above described. Suitable fasteners 58 may be employed to secure the means Y to the head A. As shown, the column 33 projects upwardly from the spindle 35 and terminates in an end face at the under side of the burner 16. An opening 29' is provided in the shroud 28 in alignment with the opening 29 so that the nozzle 17 that is carried on the upper end face of the column 33 directs fuel into the interior of the combustion section 20 of the burner 16.

When the apparatus is in operation, the torque produced by the means X will act to rotate the head A and the parts carried thereby in one direction rotatively of the standard Z. In order to insure positive rotation of the head A on the standard Z I have turned the air circulating means X so that increased rotative forces are generated. As shown in Fig. 4 of the drawings, the axis of the prime mover 10 and fan 11 does not pass through the axis of the standard Z but projects by the axis of the standard Z at a point spaced laterally therefrom. This relationship of parts creates a lever arm of forces that turns the head A in a counter-clockwise direction as will be readily seen from Fig. 4 of the drawings.

The control means B is provided to retard or stop or position the head A so that the means X and Y deliver conditioned air in the desired direction. The control means B involves, generally, a variable stop means 60 and escapement 61 and a drive 62 for the escapement. The variable stop means 60 is carried by the rim 50 and involves a series of pins 63 spaced about the periphery of the rim 50. Each pin 63 may be threaded into an opening in the rim 50 and projects inwardly toward the center of the structure. The escapement 61 may vary as circumstances require and, as shown, may involve a rocker 64 pivotally carried by the flange 45 and having a pair of spaced ears 65 alternately engageable with the pins 63. In practice, the distance between the ears 65 may be about one and one-half times the distance between the pins 63. A pivot 66 secures the rocker 64 to the flange 45 midway between the ears 65. The drive 62 is preferably a motor drive and, as shown, involves a motor 67 preferably a synchronous motor, that operates the rocker 64. As shown in Fig. 6 of the drawings, the motor 67 drives a crank 68 that is operatively connected to the rocker 64 by means of a link 69. When the motor 67 is energized the rocker 64 is operated so that the ears 65 are alternately brought into engagement with the pins 63. The pins 63 may be employed as desired in order to stop the head A in the desired rotative position.

The power supply C is provided for energizing the motor 10 and the motor 67 and involves a power line 70, brushes 71 and slip rings 72. The power line 70 may receive power from any suitable source and extends upwardly along the standard Z. The brushes 71 are preferably carried by the flange 45 and project upwardly to have sliding contact with the rings 72 that face downwardly from an insulator 73 carried by the flange 49 on the hub of the head A. The rings 72 are concentric with the axis of the structure and are electrically connected to the prime mover 10 through lines 74. It will be apparent how the brushes and slip rings cooperate to complete the circuit to the prime mover 10 as the head A rotates relative to the standard Z.

The fuel supply D involves the column 33 and a fluid connection 75 provided at the base of the column. As pointed out above, the column 33 is tubular and carries the nozzle 17 at its upper end face. The fluid connection 75 may receive fluid under suitable pressure from a hose, or the like, so that the fluid or fuel is directed to the nozzle to be sprayed into the burner 16 of the apparatus.

From the foregoing it will be apparent that I have provided an extremely simple and efficient air conditioning apparatus that may be adjusted to effectively handle air to eliminate cold pockets of air from orchards, or the like. The effectiveness of this apparatus is augmented by providing stops that momentarily stop and position the means X and Y of the apparatus whereby a column of air is then delivered in one direction to effectively remove the cold air from a given area. After each positioning of the head A by the control means B the head A advances to the next stop and so on, the operation of the apparatus being continuous and requiring a minimum amount of attention when once set in motion.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. Air circulating and conditioning apparatus including, a vertically disposed standard, a head on the upper end of the standard with a spindle carried by the standard and with a hub rotatably supported by the spindle, an air circulating means carried by and at the forward side of the hub on an axis projecting by the vertical axis of the standard at a point spaced laterally therefrom and including a prime mover driving a fan, an air conditioning means carried by the hub and adapted to receive and temper a portion of the air delivered thereto by the circulating means, and a control means for stopping and positioning the hub as it is rotated including a series of circumferentially spaced pins positioned and released by an escapement having a part successively engageable with the pins.

2. Air circulating and conditioning apparatus including, a vertically disposed tubular standard, a head on the upper end of the standard with a spindle carried by the standard and with a hub rotatably suported by the spindle, an air circulating means carried by and at the forward side of the hub on an inclined axis projecting by the vertical axis of the standard at a point spaced therefrom and including a prime mover driving a fan, an air conditioning means carried by and at the top of the hub on an axis spaced from and inclined relative to the axis of the circulating means and adapted to receive and temper a portion of the air delivered thereto by the circulating means and including a burner having a shell with a slotted combustion section closed at its forward end by a wall and with a rearwardly opening delivery section, there being a forwardly opening shroud surrounding the combustion section and directing air to the slots, and a control means for stopping and positioning the hub as it is rotated including a series of circumferentially spaced pins positioned and released by an escapement having a part successively engageable with the pins.

3. Air circulation and conditioning apparatus including, a vertically disposed standard, a head on the upper end of the standard with a spindle carried by the standard and with a hub rotatably supported by the spindle, an air circulating means carried by and at the forward side of the hub on a substantially horizontal axis extending transverse of the hub and including a prime mover driving a fan, and an air conditioning means carried by the hub and adjacent one side of the prime mover and on an axis spaced from and substantially parallel with the axis of the circulating means and adapted to receive and temper a portion of the air delivered by the fan.

4. Air circulating and conditioning apparatus including, a vertically disposed standard, a head on the upper end of the standard with a spindle carried by the standard and with a hub rotatably supported by the spindle, an air circulating means carried by the hub and angularly related to the axis of the standard to direct air substantially downwardly and on an axis extending transverse of the hub and including a prime mover driving a fan, and an air conditioning means carried by the hub in a fixed position spaced from and adjacent one side of the prime mover and on an axis spaced from and substantially parallel with the axis of the circulating means and adapted to receive and temper a portion of the air delivered by the fan.

5. Air circulating and conditioning apparatus including, a vertically disposed standard, a head on the upper end of the standard with a spindle carried by the standard and with a hub rotatably supported by the spindle, an air circulating means carried by and at the forward side of the hub on an axis extending transverse of the hub and including a prime mover driving a fan, and an air conditioning means carried by the hub and adapted to receive and temper a portion of the air delivered by the fan and including a burner having a tubular shell closed at its forward end by a wall and with a rearwardly opening delivery end and having circumferentially spaced longitudinally extending slots for the reception of combustion air.

6. Air circulating and conditioning apparatus including, a vertically disposed standard, a head on the upper end of the standard with a spindle carried by the standard and with a hub rotatably supported by the spindle, an air circulating means carried by and at the forward side of the hub on an axis extending transverse of the hub and including a prime mover driving a fan, and an air conditioning means carried by the hub and adapted to receive and temper a portion of the air delivered by the fan and including a burner having an elongate tubular shell closed at its forward end by a wall and with a rearwardly opening delivery end and having circumferentially spaced slots for the reception of air, there being a forwardly opening shroud surrounding the combustion section and in communication with the slots and directing air thereto to enter into the shell.

7. Air circulating and conditioning apparatus including, a vertically disposed tubular standard, a head on the upper end of the standard with a spindle carried by the standard and with a hub rotatably supported by the spindle, an air circulating means carried by and at the forward side of the hub on an axis extending transverse of the hub and including a prime mover driving a fan, an air conditioning means carried by and fixed to the top of the hub and adapted to receive and temper a portion of the air delivered by the fan and including a burner having a tubular shell with an opening therein receiving the upper end of the standard, and a fuel handling nozzle fixedly carried by the upper terminal end of the standard and at the opening in the shell and directing fuel into the shell for combustion.

8. Air circulating and conditioning apparatus including, a vertically disposed tubular standard, a head on the upper end of the standard with a spindle carried by the standard and with a hub rotatably supported by the spindle, an air circulating means carried by and at the forward side of the hub on an axis extending transverse of the hub and including a prime mover driving a fan, an air conditioning means carried by and fixed to the hub and adapted to receive and temper a portion of the air delivered by the fan and including a burner having a tubular shell with an opening therein receiving the upper end of the standard and closed at its forward end by a wall and with a rearwardly opening delivering end and having circumferentially spaced slots for the reception of combustion air, and a fuel handling nozzle fixedly carried by the upper terminal end of the standard and at the opening in the shell and directing fuel into the shell for combustion.

References Cited in the file of this patent

UNITED STATES PATENTS

| | | |
|---|---|---|
| 1,905,502 | Reid | Apr. 25, 1933 |
| 2,097,255 | Saha | Oct. 26, 1937 |
| 2,231,454 | Saxe | Feb. 11, 1941 |
| 2,231,620 | Goldenberg | Feb. 11, 1941 |
| 2,632,978 | Fetrow et al. | Mar. 31, 1953 |
| 2,683,957 | Harms et al. | July 20, 1954 |